United States Patent [19]

Sato et al.

[11] Patent Number: 4,784,680
[45] Date of Patent: Nov. 15, 1988

[54] METHOD OF AND APPARATUS FOR MANUFACTURING FLOAT GLASS

[75] Inventors: Yasuo Sato; Tsunehiro Saito; Hiroshi Mase; Katsuhiro Haruyama; Masaaki Yoshikawa, all of Yokohama, Japan

[73] Assignee: Asahi Glass Company Ltd., Tokyo, Japan

[21] Appl. No.: 68,415

[22] Filed: Jul. 1, 1987

[30] Foreign Application Priority Data

Jul. 3, 1986 [JP] Japan .................................. 61-155026

[51] Int. Cl.$^4$ ....................... C03B 18/04; C03B 18/06
[52] U.S. Cl. ...................................... 65/99.6; 65/182.4
[58] Field of Search ..................... 65/99.6, 182.4, 182.5

[56] References Cited

U.S. PATENT DOCUMENTS 3,492,107 1/1970 Simpson et al. ............... 65/182.4 X
3,496,736 2/1970 Hurwitz et al. ..................... 65/99.6
3,733,190 5/1973 Lawrenson et al. ............. 65/99.6 X

FOREIGN PATENT DOCUMENTS 49-5206 2/1974 Japan .................................. 65/99.6
245293 6/1969 U.S.S.R. ............................. 65/99.6
245294 6/1969 U.S.S.R. ............................. 65/99.6
230394 8/1970 U.S.S.R. ............................. 65/99.6

Primary Examiner—Robert L. Lindsay
Attorney, Agent, or Firm—Oblon, Fisher, Spivak, McClelland & Maier

[57] ABSTRACT

Difference in height is provided between a first surface of a molten metal bath at the upstream side in a vessel and a second surface thereof by means of a linear induction motor. A glass ribbon supplied to the first surface is formed to have a predetermined thickness while it is moved from the first surface to the second surface.

11 Claims, 4 Drawing Sheets

METHOD OF AND APPARATUS FOR MANUFACTURING FLOAT GLASS

BACKGROUND OF THE INVENTION

The present invention relates to a method of and an apparatus for manufacturing float glass.

There has been known a method of manufacturing a glass plate having a thickness smaller that the equilibrium thickness of the glass plate by using a float process. Namely, molten glass is supplied to a molten metal bath to form a glass ribbon, and the glass ribbon is subjected to a pulling force on the molten metal bath to be stretched. Since the glass ribbon tends to contract in its width direction when being stretched, a pair of top rollers are provided so that both edges of the glass ribbon are in contact with the top rollers to prevent the glass ribbon from contracting. The elogation of the glass ribbon is carried out at a relatively low temperature such as 950° C.–800° C. to make the use of the top rolls effective. However, such low temperature increases the viscosity of glass (in $Na_2O$-$CaO$-$SiO_2$ series glass used for window glasses for buildings, log $\eta$ (the viscosity of glass in the unit of poise) is about 4.8–6.5). Therefore, there was a problem that a long distance was required for the float glass to reduce its thickness from the equilibrium thickness to a target thickness (for instance, when the target thickness is 1 mm, the length is about 20 m). As a result, the size of a vessel containing the molten glass bath became large and a large amount of energy was lost. Further, in this case, job efficiency for glass products decreases since both edges of the glass ribbon are very thick.

Japanese Examined Patent Publication No. 6844/1975 discloses a method of forming a thin glass ribbon wherein a standing wave is formed on the molten metal bath and the glass ribbon is moved beyond a projection formed by the standing wave. However, a slight change in the standing wave largely affects the thickness of the glass ribbon. Accordingly, it is difficult to control the thickness of the glass ribbon. Further, since the standing wave is formed by raising a part of the surface of a molten metal, it is difficult to form the standing wave having a stable shape. Accordingly, distortion results in the glass ribbon, whereby uniform thickness of the glass ribbon can not be obtained. In the method of using the standing wave, since the glass ribbon has a thickness thinner than the target thickness when the glass ribbon is passed beyond the reach of the standing wave, the glass ribbon is easily broken. As a method of forming the float glass having a thickness thicker than the equilibrium thickness, a ribbon width control means such as a carbon fender or the top rollers is provided at both sides of the vessel so that the shape of the glass ribbon between a lip and the ribbon width control means is detected, and the content of glass falling from the lip is adjusted. However, there arise such problems that efficiency for working is low.

SUMMARY OF THE INVENTION

It is an object of the present invention to provide a method of and an apparatus for manufacturing float glass having a thickness thinner than an equilibrium thickness without causing distortion in the glass and with a small molten metal bath to save energy and increased efficiency.

It is an object of the present invention to provide a method of and an apparauts for manufacturing float glass which permits easy operation when a glass plate having a thickness thicker than an equilibrium thickness.

It is another object of the present invention to provide float glass manufacturing by the above-mentioned method.

The foregoing and the other objects of the present invention have been attained by providing a method of manufacturing float glass having a predetermined thickness by continuously supplying molten glass on the surface of a molten metal bath contained in a vessel to form a glass ribbon and by advancing the glass ribbon, characterized in that a first horizontal molten metal bath surface and a second horizontal molten metal bath surface are respectively formed at the upstream side and the downstream side in the vessel so as to provide the difference in height between the first and second bath surfaces by the action of a linear induction motor, wherein the glass ribbon having a predetermined thickness is formed by moving it from the first bath surface to the second bath surface.

Further, the present invention provides an apparatus for manufacturing float glass having a predetermined thickness by continuously supplying molten glass on the surface of a molten metal bath held in a vessel to form a glass ribbon and by moving the glass ribbon forwardly, characterized by comprising a linear induction motor positioned below the vessel or above the molten metal bath so as to provide the difference in height between a first horizontal surface of the molten metal bath at the upstream side in the vessel and a second horizontal surface of the molten metal bath at the downstream side in the vessel.

According to the present invention, difference in height is formed between the first horizontal molten metal bath surface at the upstream side in the vessel and the second horizontal molten metal bath surface at the downstream side. When a glass ribbon having a thickness thinner than the equilibrium thickness of the molten glass is formed on the molten metal bath, the level of the first bath surface is determined to be lower than the second bath surface. When a glass ribbon having a thickness greater than the equilibrium thickness, the first bath surface is determined to be higher than the second bath surface. The difference in height between the first and second bath surfaces is desirably determined to be in the range of 0.5 mm–6 mm when the thickness of the glass ribbon thinner than the equilibrium thickness is manufactured. The difference in height can be determined depending on the thickness of the glass to be manufactured.

The difference in height between the first and second bath surfaces is formed by applying an electromagnetic force to the molten metal, and the difference can be easily changed by changing the electromagnetic force. As means for imparting the electromagnetic force, British Pat. No. 1107099 discloses a linear induction motor in which a three phase a.c. voltage is applied to a comb-teeth like primary iron core on which coils are wound, and the coils are successively excited to form a magnetic field travelling in a predetermined direction, whereby an electric current is induced in the molten metal bath by the travelling magnetic field. A Lorenz force is produced by the travelling magnetic field and the electric current. Accordingly, a body force is generated in the molten metal bath in the same direction as the travelling magnetic field, whereby the difference in height is formed between the first bath surface and the second bath surface. Namely, when a travelling magnetic field of about 50 Gauss (when a length of a linear-induction motor is about one meter) is applied to the molten metal bath, the difference in height of about 2.8 mm is formed in the molten metal bath. When the difference in height of about 16 mm is required, it is necessary to apply the travelling magnetic field of about 120 Gauss. At the boundary of the first and second bath surfaces, an inclined surface region is formed. When the glass ribbon is passed through the inclined surface, the viscosity is preferably determined to be in the range of 3.1–4.8 in common logarithm ($\eta$). When log $\eta$ is greater than 4.8, distortion is apt to be produced in the glass, whereas when log $\eta$ is smaller than 3.1, the temperature of the bath is excessively high to cause a high energy loss and erosion of the vessel. It is preferable that when the glass ribbon reaches the second bath surface, the viscosity of the glass should be decreased to log $\eta = 6.5$ by cooling the glass ribbon so as not to cause attenuation of glass-ribbon width.

In the present invention, the thickness of the glass ribbon becomes near a target thickness at the border region of the first and second bath surfaces, and the glass ribbon has the correct target thickness at the upstream portion of the second bath surface. The position to determine the target thickness shifts to the upstream side as a speed for drawing the glass ribbon is increased. Usually, the position is located within 3 m from the border area of the first and second bath surfaces.

DETAILED DESCRIPTION OF THE PREFERRED EMBODIMENTS

Preferred embodiments of the present invention will be described with reference to the drawings.

Figure 1:
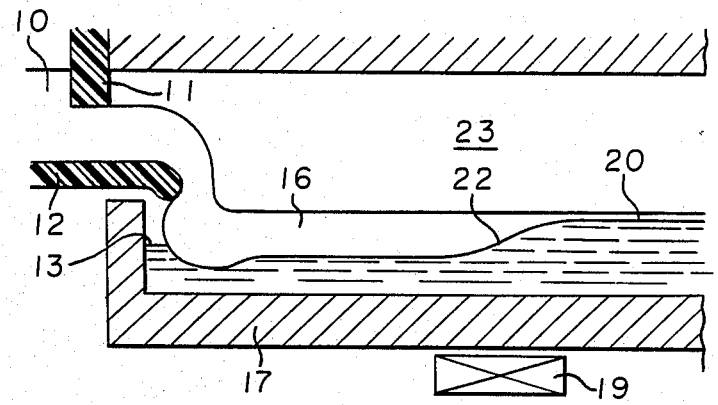
FIG. 1 is a diagram longitudinally cross-sectioned of an embodiment of the apparatus for manufacturing float glass according to the present invention.
Figure 2:
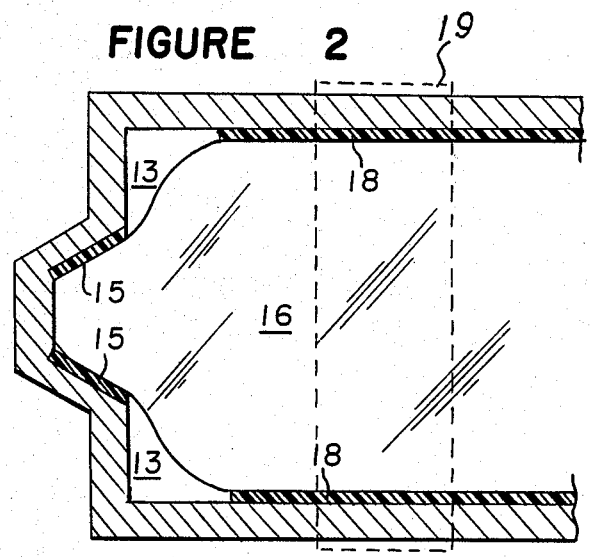
FIG. 2 is a plan view partly cross-sectioned of the apparatus shown in FIG. 1.

In FIGS. 1 and 2, molten glass 10 is advanced in a glass melting furnace and a flow rate for advancing the plastic or molten glass is adjusted by a refractory tweel 11 provided at the front edge of a canal following to the glass melting furnace. Then, the molten glass having been subjected to flow-rate adjustment falls on a first horizontal surface 13 of the molten metal bath from an end of a lip 12. The temperature of the molten glass just fallen is about 1100° C. and it has an extremely small viscosity (the viscosity for a composition used for an ordinary window glass is 3.65 in common logarithm (log $\eta = 3.65$). The molten glass spreads on the first bath surface along restrictor tiles 15 to become a glass ribbon 16 having the equilibrium thickness and then covers the first molten metal bath wherein both sides of the glass ribbon are in wet-contact with side walls 18 of a vessel 17 in which the molten metal bath is contained.

A linear induction motor 19 having substantially the same width as the width of the vessel 17 is provided below the bottom of the vessel 17 to produce a magnetic field travelling in the downstream direction of the vessel (to the right in FIGS. 1 and 2). The magnetic field produces a force to move the molten metal in the downstream direction, whereby a second horizontal bath surface 20 whose level is higher than the first bath surface is formed at the downstream side and an inclined bath surface 22 is formed at the boundary region of the first and second bath surfaces. Since a substantially uniform force is applied to the molten metal from its bottom portion to its bath surface portion by the linear induction motor, there causes substantially no flow of the molten metal. The difference in height between the first and second bath surfaces is determined depending on the thickness of a glass plate to be manufactured. For instance, when a glass plate having a thickness 3 mm is manufactured, the difference in height is preferably about 2 mm. For a glass plate having a thickness 0.5 mm, a preferable range of the difference in height is 3 mm–4 mm. The difference can be changed by changing a power to be supplied to the linear induction motor. The linear induction motor may instead by provided in a space 23 above the molten metal bath.

The side walls 18 of the vessel containing the molten metal are preferably formed by a material having electric conductivity greater than that of the molten metal. As such a material, tungsten, an alloy of tungsten or $ZrB_2$ is preferably used since there is no substantial reduction in the force for moving the glass ribbon forwardly by means of the linear induction motor. The glass ribbon having the equilibrium thickness on the first bath surface is forwarded to the inclined bath surface 22 where the thickness of the glass ribbon becomes rapidly thinned by a suppressing force given by the difference in height of the first and second bath surfaces, and the thickness of the glass ribbon becomes near the target thickness when it reaches the second bath surface 20. At the upstream in the second bath surface, the glass ribbon has a correct target thickness. It is preferable that the viscosity of the glass ribbon is in the range of 3.1–4.4 at this moment. The temperature corresponding to the viscosity is about 1200°–1000° C. for a normal window glass.

It is preferable that the glass ribbon is rapidly cooled while it is advanced on the second bath surface 20 so that the viscosity of the glass ribbon is increased so as not to increase the thickness of the glass ribbon. In this case, the log $\eta$ of the glass ribbon is about 6.5. It is desirable that the glass ribbon have wettability to the side walls until the log $\eta$ of the glass ribbon becomes 4.0–4.8 because it is considered that the effect of the surface tension of the glass ribbon is lost and a force for increasing the thickness of the glass ribbon is substantially eliminated. It is preferable that after the glass ribbon has been so cooled that log $\eta$ has become in the range of 4.0–4.8, the both side edges of the glass ribbon are separated from the side walls. It is because a large suppressing force acts on the both edges of the glass ribbon with the above-mentioned viscosity and distortion of the glass becomes large.

When there is possibility that the thickness of the glass ribbon increases while the glass ribbon is cooled so that log η is changed from 4.0-4.8 to 6.5, the top rollers 5 may be used at both sides. In this case, reduction of efficiency is extremely small because the glass ribbon is rendered to have the target thickness. Further, the number of top rollers can be small. Then, the glass ribbon is further cooled and is taken from the vessel to be sent to an annealing lehr (not shown).

Figure 3:
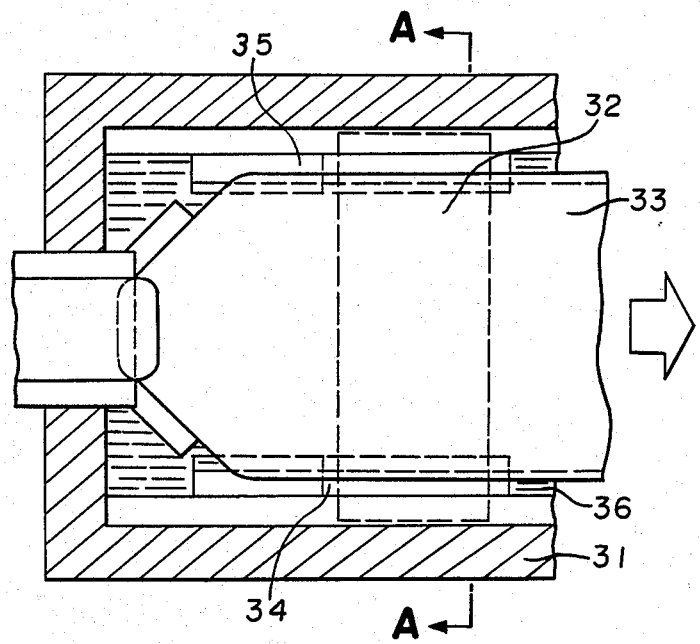
FIG. 3 is a plan view partly cross-sectioned and broken of another embodiment of the apparatus for manufacturing float glass according to the present invention.
Figure 4:
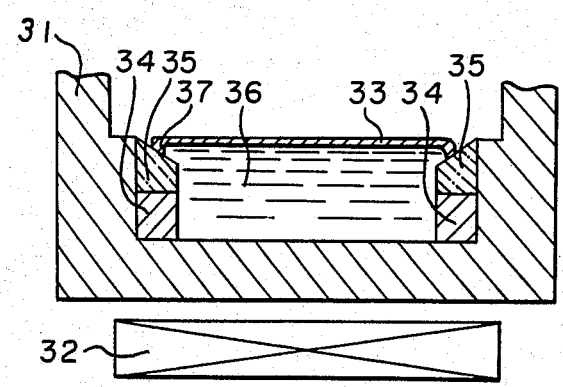
FIG. 4 is a cross-sectional view taken along a line A—A in FIG. 3.

In the apparatus as shown in FIGS. 3 and 4, a linear induction motor 32 having a width slightly greater than the width of a glass ribbon33 is provided below a vessel 31. A pair of electric conductive members 34 made of an electric conductive material such as W, ZrB₂ and so on are respectively provided at the both sides in the vessel 31 at the positions below the edge portions of the glass ribbon33 and in a molten metal bath 36. On each of the electric coductive members 34, a glass ribbon width maintaining member 35 is placed. The maintaining members 35 are also immersed in the molten metal bath 36. The maintaining members 35 prevent attenuation of the width of the glas ribbon having a thickness smaller than the equilibrium thickness due to the action of the surface tension and the tractive force. The upper surface of the maintaining members 35 are respectively inclined downwardly toward the center of the vessel and the top of the upper surface is substantially flush with the bath surface of the molten metal bath 36. The maintaining members are made of a material such as graphite, BN, AlN and so on which has non-wettability to the molten glass and the molten metal bath. Accordingly, the bath surface assumes a shape wherein both edges portions acutely descend and come to contact with the upper surface of the maintaining members as shown in FIG. 4. Of the material to be used for the maintaining members, graphite is the most appropriate material because it has non-wettable properties to the molten metal bath. A body force is given to the molten metal bath from the upstream side to the downstream side by means of the linear induction motor 32 so that the second bath surface formed on the downstream side with respect to the linear induction motor 32 is higher than the first bath surface at the upstream side of the motor.

The upper surface of the maintaining members 35 is inwardly inclined, and therefore, the molten metal does not overflow beyond the maintaining members even though the second bath surface is higher than the first bath surface. It is desired that an angle of inclination of the upper surface of each of the maintaining members is in a range of 5°-60° to the horizontal plane. When the inclination angle is smaller than the above-mentioned value, the thickness of the glass ribbon increases and job efficiency of glass products decreases. On the other hand, when the inclination angle is greater than the above-mentioned value, the width of the glass ribbon tends to cause contraction.

The maintaining members 35 are preferably extended along the forwarding direction of the glass ribbon from the upstream side of the linear induction motor to such a position that log η of the glass ribbon becomes about 6.5. A satisfactory result can be obtained by providing the electric conductive members 34 at the upstream side of the linear induction motor.

In the apparatus shown in FIGS. 3 and 4, the molten glass supplied onto the first bath surface is rendered to be a glass ribbon having the equilibrium thickness. The glass ribbon has a target thickness while the glass ribbon is moved from the first bath surface to the second bath surface. In this moment, the edge portions 37 of the glass ribbon are slightly curved downwardly in accordance with the shape of the second bath surface as shown in FIG. 4. The curved edge portions 37 of the glass ribbon prevent contraction in the width of the glass ribbon by the action of surface tension and the tractive force applied thereto. Thus, the glass ribbon formed to have the target thickness is cooled to have a vicinity of about 6.5 of log η so that the contraction of the glass ribbon in its width direction does not take place. In this case, since the glass ribbon is not in wet-contact with the maintaining members, they produce no supressing force to prevent forward movement of the glass ribbon even though the glass is cooled to the above-mentioned viscosity. Therefore, there is no risk of distortion in the glass ribbon.

Then, the glass ribbon is moved forwardly on the second bath surface without the maintaining members while it is cooled, and finally, the glass ribbon is taken out from the vessel. The body force given by the linear induction motor is not decreased in the viscosity of the maintaining members since the electric conductive members 34 are provided below the maintaining members 35. Accordingly, the difference in height between the first and second bath surfaces does not become small at a position near the maintaining members 35.

Figure 5:
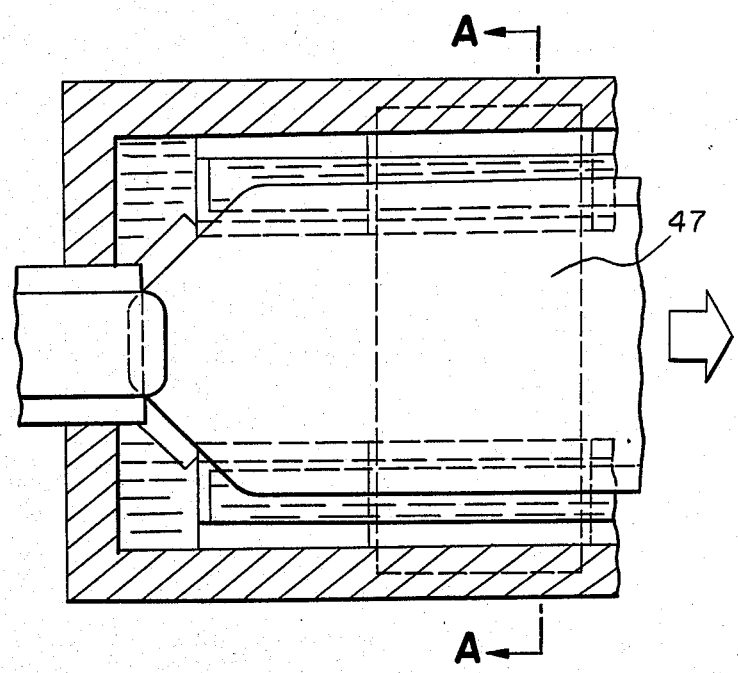
FIG. 5 is a plan view partly cross-sectioned and broken of another embodiment of the apparatus for manufacturing float glass according to the present invention.
Figure 6:
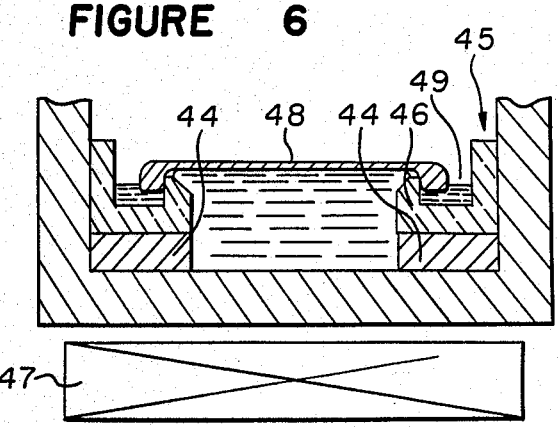
FIG. 6 is a cross-sectional view taken along a line A—A in FIG. 5.
Figure 6:
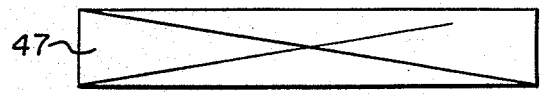

FIGS. 5 and 6 show a separate embodiment of the apparatus for manufacturing float glass.

In FIG. 6, glass ribbon width maintaining members 45 each constituted by an inner wall 46, a bottom wall and an outer wall which form a U-shape in cross section are placed on electric conductive members 44 which are provided both inner side of the vessel. The upper end of the inner wall 46 as a structural element of each of the maintaining members 45 extends to a level which is flush with or slightly lower than a second bath surface 48 at the downstream side of the linear induction motor. Since the maintaining members are made of a material having non-wettable properties to the molten metal and the molten glass, there is no risk that the molten metal overflows from the top end of the inner wall 46 to a channel 49.

The top end of the inner wall at the upstream side of the linear induction motor is so determined that it is flush with or slightly lower than the first bath surface. The width of the channel 49 is narrow and therefore the body force is not substantially applied to the molten metal by the linear induction motor. As a result, the bath surface in the channel is determined to be lower than the top end of the inner wall 46.

The function of the embodiment shown in FIGS. 5 and 6 is substantially the same as that in FIGS. 3 and 4. Namely, the second bath surface having a higher level is formed in the vessel at the downstream side with respect to the linear induction motor, while the first bath surface having a lower level is formed at the upstream side.

The molten glass is supplied onto the first bath surface and the glass ribbon having the equilibrium thickness if formed. Then, the glass ribbon is rendered to have the target thickness while it is moved from the first bath surface to the second bath surface. At this moment, both side edges of the glass ribbon assume a shape that both free ends extending beyond the top edges of the inner walls 46 slightly curve downwardly, and the both free ends are held by the bath surface of the molten metal received in the channels 49. The shape of the free ends of the glass ribbon prevents reduction in the width of the glass ribbon due to the surface tension and the tractive force. The glass ribbon is moved forwardly on the bath surface keeping the above-mentioned state and is cooled until log $\eta$ becomes about 6.5.

Figure 7:
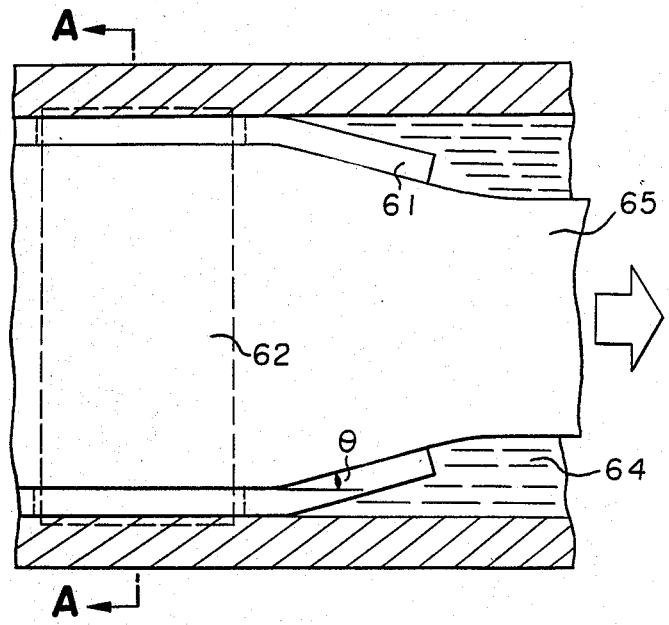
FIG. 7 is a plan view partly cross-sectioned and broken of still another embodiment of the apparatus for manufacturing float glass according to the present invention.
Figure 8:
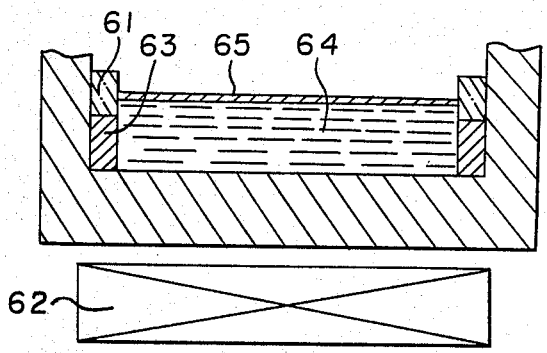
FIG. 8 is a cross-sectional view taken along a line A—A in FIG. 7.

FIGS. 7 and 8 show still another embodiment of the apparatus for manufacturing float glass according to the present invention.

A glass ribbon width maintaining members 61 are made of a material having wettable properties to the glass ribbon. As the material to be used for the maintaining members, a silimanite series refractory is desirably used. Each of the maintaining members 61 is placed in the vessel so as to be inclined at an angle $\theta$ in the forwarding direction of the glass ribbon so that the width of the glass ribbon is reduced toward the downstream side with respect to the position of the linear induction motor, whereby there is produced the glass ribbon having side edges whose thickness is small at the local portions. A preferable range of the inclination angle $\theta$ is 5°–30°. When the angle $\theta$ is smaller than the above-mentioned range, the effect for preventing formation of the edge portions of the glass ribbon having locally thinner portions, is small. On the other hand, when the inclination angle $\theta$ is greater than that range, the thickness of the edges of the glass ribbon becomes too thick, and the width of the glass ribbon is reduced.

An electric conductive member 63 is provided along the inner walls of the vessel and is immersed in a molten metal bath 64. The electric conductive members are provided above a linear induction motor 62.

In the apparatus as shown in FIGS. 7, 8, the glass ribbon having the equilibrium thickness on the first bath surface is moved to the second bath surface having a level higher than the first bath surface by the action of the linear induction motor, in the case of which the glass ribbon is formed to have the target thickness. Since both edges of the glass ribbon are in wet-contact with the maintaining members 61, there is no reduction of the width of the glass ribbon by the influence of the surface tension and the tractive force. The width of the glass ribbon is maintained along the obliquely placed maintaining members. After the glass ribbon has been cooled to have a predetermined viscosity (about 4.0–4.8 in log $\eta$), the glass ribbon is separated from the maintaining members, at which time it is rapidly cooled to have the viscosity of about 6.5 in log $\eta$. The width of the glass ribbon preferably can be maintained when the speed of cooling is 2° C./sec. or higher.

When log $\eta$ is 4.8 or lower even though the edge portions of the glass ribbon is in wet-contact with the maintaining members, there results no substantial supressing force applied to the edge portions of the glass ribbon in its forwarding direction. Accordingly, there is no distortion in the glass ribbon.

In the foregoing, description has been made as to manufacture of a glass ribbon having a thickness thinner than the equilibrium thickness. However, a glass ribbon having a thickness thicker than the equilibrium thickness is manufactured as follows.

With reference to FIG. 1, a travelling magnetic field travelling in the upstream direction is produced by changing the phase of a power to be applied to the linear induction motor 19. Then, contrary to the case shown in FIG. 1, the first bath surface at the upstream side of the vessel becomes higher than the second bath surface of the downstream side. The glass ribbon having the equilibrium thickness on the first surface is forwarded to the second bath surface, in the course of which the thickness of the glass ribbon becomes large, and then, the glass ribbon is rapidly cooled on the second bath surface. Difference in height between the first and second bath surfaces is preferably in the range of 0.5 mm–15 mm, however, it may be changed depending on the thickness of the glass ribbon to be manufactured. For instance, when the glass ribbon having a thickness of 8 mm is to be manufactured, the difference of about 1 mm is desirable. On the other hand, when the glass ribbon of a thickness of 18 mm is to be manufactured, the difference of about 13 mm is desirable. A preferable range of the viscosity of the glass ribbon is 3.1–4.4 in log $\eta$ in the boundary region of the first and second bath surfaces. More preferably, the viscosity is in the range of 3.1–4.0 in log $\eta$.

In this case, it is preferable that the glass ribbon is wettable to the side walls of the vessel until the glass ribbon is cooled to be 4.4 in log $\eta$. And, it is preferable that the glass ribbon is rapidly cooled to have the viscosity of 6.5 in log $\eta$ so as not to reduce the thickness of the glass ribbon. In this case, the both edges of the glass ribbon should not be in contact with the side walls. When there is tendency of reduction in the thickness due to short of cooling effect, top rollers or a carbon fender may be provided in the second bath surface region.

According to the method of the present invention, since the glass ribbon having the equilibrium thickness is formed on the first surface, an amount of the molten glass to be suppled to the vessel may be accurately adjusted.

[EXAMPLE]

The apparatus shown in FIGS. 3 and 4 was used. The linear induction motor was actuated. Then, a travelling magnetic field of about 50 Gauss (when a length of linear-induction motor is about one meter) was induced in the bath surface of a molten tin bath, whereby the level of the second bath surface at the downstream side was 2.8 mm higher than the level of the first bath surface at the upstream side. Molten glass (soda-lime-Silica glass to be used for window glasses) heated at about 1100° C. was continuously supplied onto the first bath surface to form a glass ribbon having the equilibrium thickness. The glass ribbon was moved from the first bath surface to the second bath surface as indicated by the arrow mark and was formed by stretching it to have a thickness of 1.1 mm. During the movement of the glass ribbon, both edges of the glass ribbon assumed such a shape that they were slightly curved downwardly on the upper surface of the maintaining members 37 and held by molten tin in the channels while the glass ribbon was inwardly bent on the second bath surface. During the forward movement of the glass ribbon, it was cooled to 800° C. Then, the glass ribbon was further advanced, cooled in the bath surface where there was provided no maintaining members, and was drawn out from the vessel. The temeprature of the glass ribbon at the time of withdrawal was about 600° C. The width of the glass ribbon was 4 m and the speed of drawn was 80 m/h.

With use of a flatness measuring device (manufactured by Tokyo Koon Denpa Kabushiki Kaisha), the surface flatness of the glass ribbon was measured. The resulted surface roughness was 0.05 $\mu$m/2 mm or lower.

In the resulted glass ribbon, it was found that the surface area having uniform thickness extended near the edge portions, and about 95% in weight in the glass ribbon was available as products.

[COMPARATIVE REFERENCE]

The apparatus as shown in FIGS. 3 and 4 was used provided that the linear induction motor and the maintaining members were removed. A glass ribbon (a thickness of 1.1 mm) was manufactured according to the conventioanl method. Top rollers were used at both edges portions of the glass ribbon to prevent reduction of the width of the glass ribbon. Surface roughness of the resulted glass ribbon was measured as was the above-mentioned example. As a result, the values of the surface roughness was 0.2–0.5 μm/2 mm.

The glass ribbon had very thick edge portions, and about 50% by weight in the glass ribbon was available as products.

As described above, in accordance with the present invention, the glass ribbon is formed to have a predetermined thickness by providing a difference in height in the bath surface of a molten metal bath when a glass plate having a thickness thinner than the equilibrium thikness is to be manufactured. Accordingly, distortion resulted in the glass ribbon can be extremely small and length required to form a complete glass product can be shortened. As a result, a vessel containing the molten metal bath can be small-sized and energy loss can be reduced. The above-mentioned effect is further improved by moving the glass ribbon having viscosity in the range of 3.1–4.4 in log $\eta$ from the first bath surface to the second bath surface.

In the present invention, top rollers which are conventionally provided at edge portions of the glass ribbon to prevent reduction in the width of the glass ribbon are not necessary or only a small number of the rollers are required, and therefore, efficiency in work can be improved. Even in the case of using the top rollers, job efficiency can be remarkably increased since the thickness of the edge portions of the glass ribbon is thin.

On the other hand, when a glass plate having a thickness thicker than the equilibrium thickness is to be manufactured, the glass ribbon having the equilibrium thickness is formed on the first bath surface, and accordingly an amount of molten glass to be supplied to the first bath surface can be precisely controlled. Therefore, the glass ribbon having small fluctuation in thickness can be prepared.

We claim:

1. A method of manufacturing float glass having a predetermined thickness, comprising the steps of:
   using a linear induction motor on a molten metal bath contained in a vessel, to form a height difference between an upstream first horizontal molten metal bath surface and a downstream second continuously horizontal molten metal bath surface;
   continuously supplying molten glass to said first surface to form thereon a glass ribbon having an equilibrium thickness; and
   advancing said glass ribbon to said second surface to form thereon a glass ribbon having a predetermined thickness.

2. The method of manufacturing float glass according to claim 1, wherein said glass ribbon is moved from said first bath surface to said second bath surface while it is in wet-contact with the side walls of said vessel.

3. The method of manufacturing float glass according to claim 1, wherein said glass ribbon is moved from said first bath surface to said second bath surface while its viscosity in the terms of common logarithm of poise is in the range of from 3.1 to 4.4.

4. The method of manufacturing float glass according to claim 1, wherein said second bath surface is formed 0.5 mm–6 mm higher than said first bath surface so that the glass ribbon having a thickness thinner than said equilibrium thickness is formed.

5. The method of manufacturing float glass according to claim 2, wherein said side walls of the vessel to which said glass ribbon is in wet-contact are constituted by one from the group consisting of W, an alloy including W as a main component and $ZrB_2$.

6. The method of manufacturing float glass according to claim 1, wherein said first bath surface is formed 0.5 mm–15 mm higher than said second bath surface so that a glass plate having a thickness thicker than said equilibrium thickness is formed.

7. An apparatus for manufacturing float glass having a predetermined thickness by continuously supplying molten glass on the surface of a molten metal bath held in a vessel to form a plastic glass ribbon and by moving said glass ribbon forwardly, characterized by comprising:
   means for introducing molten glass to an upstream end of said vessel;
   a linear induction motor positioned below said vessel or above said molten metal bath, said motor extending transverse to a direction of movement of said molten glass and being oriented so as to provide a difference in height between a first horizontal surface of said molten metal bath at an upstream side in said vessel and a second horizontal surface of said molten metal bath at a downstream side in said vessel, whereby said second horizontal surface is continuously horizontal downstream of said motor, and
   a pair of glass ribbon width maintaining members which are placed in correspondence to both side edges of said glass ribbon and transverse to a direction of movement of said glass ribbon so as to prevent said glass ribbon from contraction in the direction of its width.

8. The apparatus according to claim 7, wherein said maintaining members are made of a material having non-wettability to said molten metal bath, and the upper surface of each of said maintaining members is substantially flush with said second bath surface and is inclined inwardly.

9. The apparatus according to claim 7, wherein said maintaining members are made of a material having non-wettability to said molten metal bath, and have a U-shaped form in cross section consisting of an inner wall, a bottom wall and an outer wall wherein the upper surface of said inner wall is flush with said second bath surface.

10. The apparatus according to claim 8, wherein said maintaining members are made of graphite.

11. The apparatus according to claim 7, wherein said maintaining members are made of a material having wettability to glass, and comprises means to reduce the width of said glass ribbon toward the downstream.

* * * * *